US009793958B2

(12) United States Patent
Funakawa

(10) Patent No.: US 9,793,958 B2
(45) Date of Patent: Oct. 17, 2017

(54) IMAGE PROCESSING APPARATUS, METHOD OF CONTROLLING THE SAME, AND STORAGE MEDIUM

(71) Applicant: Konica Minolta, Inc., Chiyoda-ku, Tokyo (JP)

(72) Inventor: Hisataka Funakawa, Okazaki (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/001,684

(22) Filed: Jan. 20, 2016

(65) Prior Publication Data
US 2016/0211888 A1 Jul. 21, 2016

(30) Foreign Application Priority Data

Jan. 21, 2015 (JP) ................................ 2015-009494

(51) Int. Cl.
H04B 5/00 (2006.01)

(52) U.S. Cl.
CPC ......... H04B 5/0031 (2013.01); H04B 5/0093 (2013.01)

(58) Field of Classification Search
None
See application file for complete search history.

(56) References Cited

U.S. PATENT DOCUMENTS

| 2005/0020239 | A1* | 1/2005 | Kang ............... H04N 5/2252 455/403 |
| 2007/0279311 | A1* | 12/2007 | Kai ............... G06K 19/07786 343/797 |
| 2010/0069008 | A1* | 3/2010 | Oshima ............... H04W 4/02 455/41.3 |
| 2013/0155450 | A1* | 6/2013 | Higashikawa ......... B41J 2/1752 358/1.15 |
| 2013/0156080 | A1* | 6/2013 | Cheng ............... H01Q 1/243 375/222 |
| 2016/0216921 | A1* | 7/2016 | Ohhata ................. G06F 3/1236 |
| 2016/0224289 | A1* | 8/2016 | Yamanaka ......... H04N 1/00127 |

FOREIGN PATENT DOCUMENTS

JP 2010049169 * 3/2010 ............. B41J 29/00
JP 2014-170443 A 9/2014

* cited by examiner

Primary Examiner — Zhiyu Lu
(74) Attorney, Agent, or Firm — Buchanan Ingersoll & Rooney PC

(57) ABSTRACT

An image processing apparatus includes an operation panel, a near field communication portion, and a hardware processor. The operation panel is attached to a main body of the image processing apparatus such that a position relative to the main body is variable. The near field communication portion is arranged in the operation panel and carries out near field communication with a terminal by receiving radio waves transmitted from the terminal. The hardware processor is configured to change a communication distance in near field communication with the terminal through the near field communication portion in accordance with a position of the operation panel.

10 Claims, 23 Drawing Sheets

FIG.10

SETTING OF COMMUNICATION DISTANCE
AT EACH ANGLE OF OPERATION PANEL

| PANEL ANGLE | COMMUNICATION DISTANCE |
|---|---|
| 90 DEGREES | 5mm |
| 60 DEGREES | 10mm |
| 30 DEGREES | 20mm |
| 0 DEGREE | 30mm |

FIG.15

SETTING OF COMMUNICATION DISTANCE
AT EACH POSITION OF OPERATION PANEL

| PANEL POSITION | COMMUNICATION DISTANCE |
|---|---|
| 0cm (SLOT190A) | 5mm |
| 10cm (SLOT190B) | 10mm |
| 20cm (SLOT190C) | 20mm |
| 30cm (SLOT190D) | 30mm |

FIG.22

| PANEL ANGLE | NEAR FIELD COMMUNICATION | RADIO COMMUNICATION |
|---|---|---|
| 90 DEGREES | INACTIVE | ACTIVE |
| 60 DEGREES | INACTIVE | ACTIVE |
| 30 DEGREES | ACTIVE | ACTIVE |
| 0 DEGREE | ACTIVE | ACTIVE |

IMAGE PROCESSING APPARATUS, METHOD OF CONTROLLING THE SAME, AND STORAGE MEDIUM

This application is based on Japanese Patent Application No. 2015-009494 filed with the Japan Patent Office on Jan. 21, 2015, the entire content of which is hereby incorporated by reference.

BACKGROUND OF THE INVENTION

Field of the Invention

The present disclosure relates to an image processing apparatus, a method of controlling the same, and a storage medium, and particularly to an image processing apparatus including a near field communication portion provided in an operation panel, a method of controlling the same and a storage medium storing a program executed in such an image processing apparatus.

Description of the Related Art

Some terminals such as smartphones and tablet terminals recently incorporate a function for such a communication scheme as near field communication (NFC), that is, a function for communication at a short distance. Thus, a user can communicate data with such a terminal by holding the terminal over a "predetermined position" (hereinafter also referred to as a "touch area") of a communication device. An image processing apparatus such as a multi-functional peripheral (MFP) may be adopted as one example of the "communication device" above. The image processing apparatus accepts an operation mainly on an operation panel arranged on a front surface of the apparatus.

Various techniques have been proposed for an image processing apparatus in which a unit for near field communication is arranged in the vicinity of the operation panel. For example, a communication device according to Japanese Laid-Open Patent Publication No. 2014-170443 lowers sensitivity of a touch panel when the unit for near field communication operates, in order to prevent interference of electric field between the touch panel in the operation panel and the unit for near field communication.

In providing a unit for near field communication in an image processing apparatus, the near field communication unit may be arranged in an operation panel. This case is advantageous in that an operation for start is easy, whereas it is at the same time disadvantageous in that communication is started against user's intention as a result of such a situation that the user inadvertently holds a terminal over a touch area of the operation panel (for example, the user simply passes by the image processing apparatus).

Furthermore, an image processing apparatus in recent years may include a mechanism for changing a position of an operation panel for improvement in operability of a user. In such an image processing apparatus, as a result of change in position of the operation panel by another user, such a situation is more likely that a terminal is held over a touch area against user's intention as a result of the fact that the user simply passes by the image processing apparatus and the terminal of the user is held over the touch area. Then, start of near field communication against the user's intention may be more likely.

In view of the above circumstances, it is needed to avoid start of near field communication with a terminal against user's intention while an operation for starting near field communication with the terminal is facilitated in an image processing apparatus.

SUMMARY OF THE INVENTION

According to one aspect of the present disclosure, an image processing apparatus capable of near field communication with a terminal is provided. The image processing apparatus includes an operation panel attached to a main body of the image processing apparatus so as to be variable in position relative to the main body of the image processing apparatus, a near field communication portion arranged in the operation panel and configured to carry out near field communication with the terminal by receiving radio waves transmitted from the terminal, and a hardware processor configured to change a communication distance in near field communication with the terminal through the near field communication portion in accordance with a position of the operation panel.

According to another aspect of the present disclosure, an image processing apparatus capable of near field communication with a terminal is provided. The image processing apparatus includes an operation panel attached to a main body of the image processing apparatus so as to be variable in position relative to the main body of the image processing apparatus, a near field communication portion arranged in the operation panel and configured to carry out near field communication with the terminal by receiving radio waves transmitted from the terminal, and a hardware processor configured to determine whether to have the near field communication portion carry out near field communication in accordance with a position of the operation panel.

According to yet another aspect of the present disclosure, a method of controlling an image processing apparatus capable of near field communication with a terminal is provided. The image processing apparatus includes an operation panel attached to be variable in position relative to a main body of the image processing apparatus and a near field communication portion arranged in the operation panel and configured to carry out near field communication with the terminal by receiving radio waves transmitted from the terminal. The control method includes changing a communication distance in near field communication with the terminal through the near field communication portion in accordance with a position of the operation panel.

According to yet another aspect of the present disclosure, a method of controlling an image processing apparatus capable of near field communication with a terminal is provided. The image processing apparatus includes an operation panel attached to be variable in position relative to a main body of the image processing apparatus and a near field communication portion arranged in the operation panel and configured to carry out near field communication with the terminal by receiving radio waves transmitted from the terminal. The control method includes determining whether or not to have the near field communication portion carry out near field communication with the terminal in accordance with a position of the operation panel.

According to yet another aspect of the present disclosure, a non-transitory computer-readable storage medium storing a program executed by a computer of an image processing apparatus capable of near field communication with a terminal is provided. The program causes a computer to perform the method of controlling an image processing apparatus described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing one example of information referred to for adjustment of a communication distance in the first embodiment.

FIG. 15 is a diagram showing one example of information referred to for adjustment of a communication distance in the second embodiment.

FIG. 22 is a diagram showing one example of information referred to for adjustment of a communication distance in the fourth embodiment.

DESCRIPTION OF THE PREFERRED EMBODIMENTS

Figure 1:
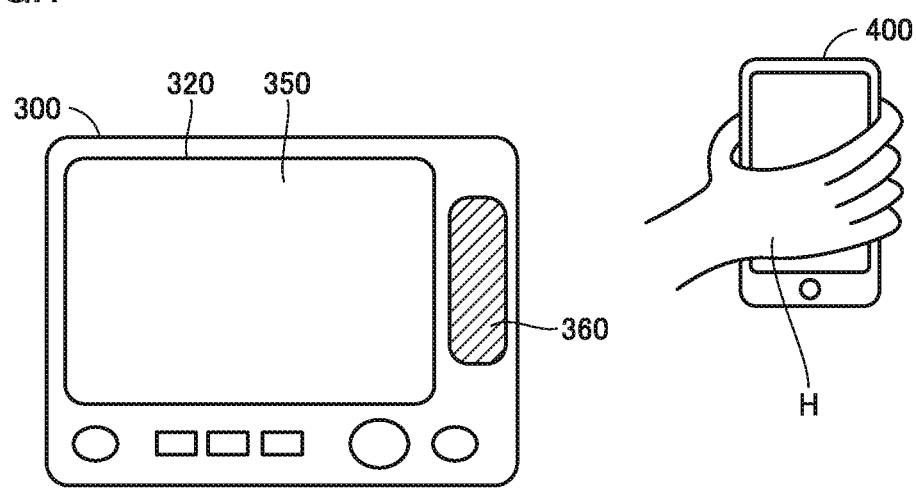
FIGS. 1 and 2 are diagrams showing positional relation during communication between an MFP and a terminal in a first embodiment.

An embodiment of an image processing apparatus will be described hereinafter with reference to the drawings. In the description below, the same elements and components have the same reference characters allotted. Their label and function are also identical. Therefore, description thereof will not be repeated.

First Embodiment

<1. Overview>

FIGS. 1 to 5 are diagrams for illustrating overview of a configuration of an MFP representing a first embodiment of an image processing apparatus according to the present disclosure. Positional relation during communication between an MFP and a terminal will initially be described with reference to FIGS. 1 and 2.

(Positional Relation Between MFP and Terminal During Communication)

Figure 2:
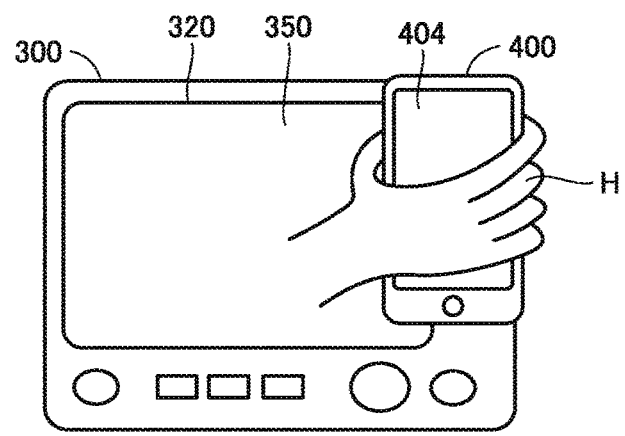

FIGS. 1 and 2 show an operation panel 300 representing a part of the MFP (an MFP 100 which will be described later) representing the first embodiment and a portable terminal 400 wirelessly communicating with the MFP. A hand H represents a hand of a user who holds portable terminal 400. Operation panel 300 includes a display 320 and a touch sensor 350 provided on display 320.

The MFP communicates with portable terminal 400 under a communication scheme relatively short in communication distance such as NFC. Communication under such a scheme is called "near field communication" herein. In order to establish "near field communication," a user brings portable terminal 400 closer to operation panel 300 as shown in FIG. 2.

In operation panel 300, a region for indicating preferred positioning of a terminal which communicates with an MFP through near field communication is set as a touch area 360. Touch area 360 is shown, for example, as a frame printed on a housing of operation panel 300. As shown in FIG. 1, touch area 360 is arranged in the vicinity of touch sensor 350. Thus, the user can have the terminal communicate with the MFP while the user views display 320.

(Content of Control in Accordance with Movement of Operation Panel)

Operation panel 300 is placed as being movable with respect to the MFP. P A content of control in accordance with movement of operation panel 300, which is carried out in the MFP in the first embodiment, will be described with reference to FIGS. 3 and 4.

Figure 3:
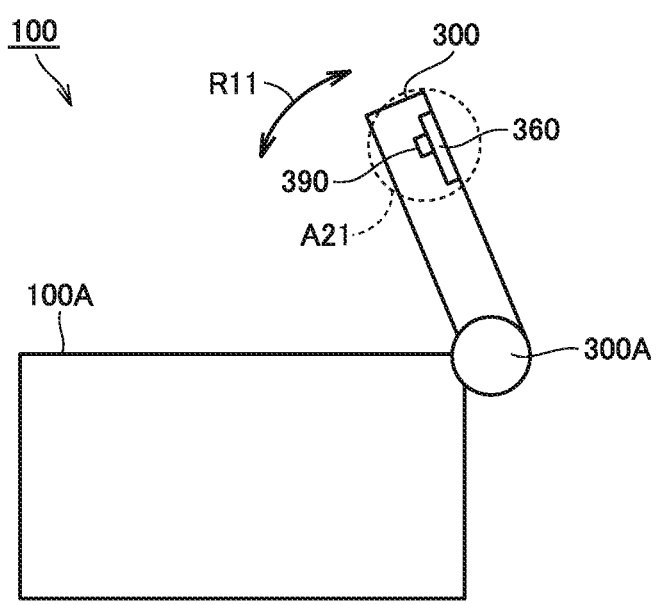
FIG. 3 is a diagram for illustrating a manner of movement of an operation panel in the MFP in the first embodiment.

FIG. 3 is a diagram for illustrating a manner of movement of operation panel 300 in the MFP. FIG. 3 shows MFP 100 in which operation panel 300 is placed. Operation panel 300 is placed with respect to a main body 100A of MFP 100 so as to pivot around a hinge 300A. FIG. 3 shows a direction of pivot of operation panel 300 with a double-headed arrow R11.

Operation panel 300 contains a near field communication portion 390 which is a communication unit made use of in near field communication. FIG. 3 shows coverage in near field communication through near field communication portion 390 with a dashed line A21. When portable terminal 400 is located within a range shown with dashed line A21, MFP 100 carries out near field communication with portable terminal 400. Namely, "coverage" can be defined as a range where a communication counterpart is located.

As operation panel 300 pivots along double-headed arrow R11, a position of near field communication portion 390 also changes in coordination. With movement of near field communication portion 390, a position of coverage in near field communication of the MFP changes.

Figure 4:
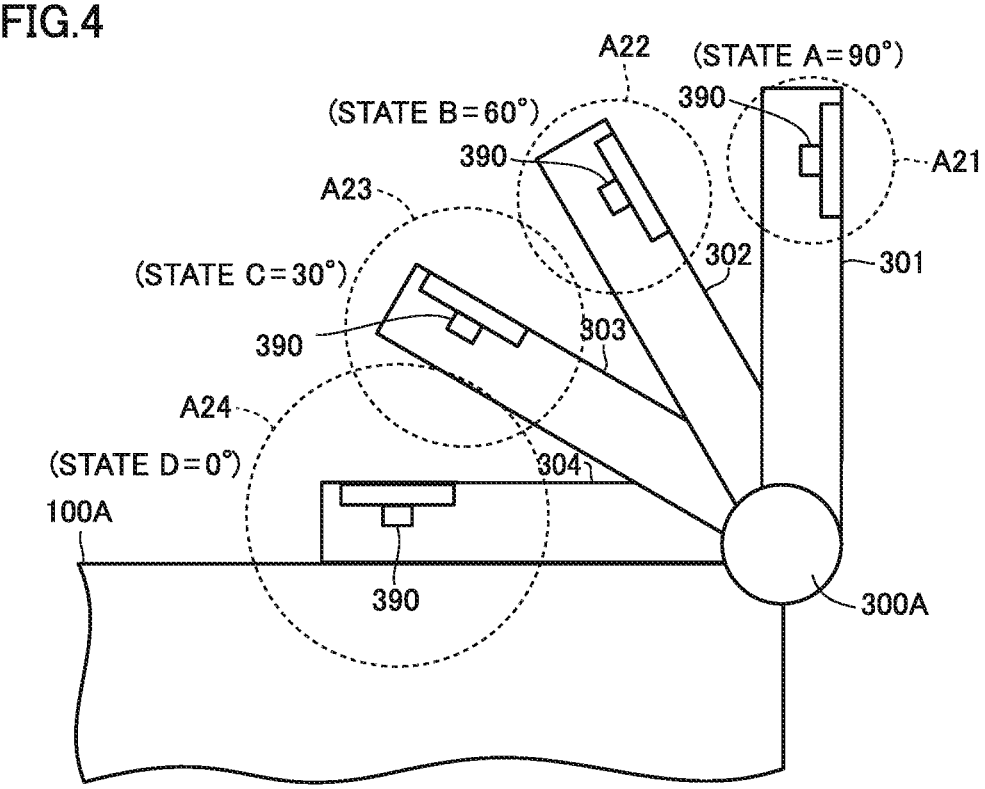
FIG. 4 is a diagram showing coverage in near field communication changed in accordance with movement of the operation panel.

FIG. 4 is a diagram showing coverage in near field communication changed with movement of operation panel 300. FIG. 4 shows four positions of operation panel 300 as positions 301 to 304, respectively. States corresponding to positions 301, 302, 303, and 304 are called a state A, a state B, a state C, and a state D, respectively. In four states A to D, an angle of a main surface of operation panel 300 with respect to a horizontal plane is different. Specifically, angles of the main surface in state A, state B, state C, and state D are 90°, 60°, 30°, and 0°, respectively.

Dashed lines A21 to A24 show coverage in near field communication in states A to D, respectively. Coverage shown with dashed lines A21 to A24 is broader in the order of dashed lines A21, A22, A23, and A24. Namely, dashed line A21 shows the narrowest coverage and dashed line A24 shows the broadest coverage. In other words, as an angle of the main surface of operation panel 300 with respect to the horizontal direction is greater, that is, as near field communication portion 390 in operation panel 300 is located on a front side of MFP 100, coverage in near field communication is narrower.

The "front side" of MFP 100 is a surface facing a user who makes use of MFP 100. MFP 100 normally faces the user on a side where operation panel 300 is arranged. Namely, in MFP 100 shown in FIG. 3, a side where operation panel 300 is placed (right side in FIG. 3) is defined as the "front side." On the other hand, an opposite side (left side in FIG. 3) is defined as a "rear side" in MFP 100.

Change among dashed lines A21 to A24 can also be handled as change in communication distance. The communication distance means a distance at which near field communication portion 390 can communicate with a terminal of a communication counterpart. Dashed lines A21 to A24 draw, for example, an annular shape around near field communication portion 390. A radius of a circle defined by each of dashed lines A21 to A24 corresponds to a communication distance of near field communication portion 390. In FIG. 4, in MFP 100 in the first embodiment, as near field communication portion 390 is located on the front side of MFP 100, it is controlled such that a communication distance thereof is shorter.

(Specific Description of Content of Control in Accordance with Movement of Operation Panel)

Figure 5:
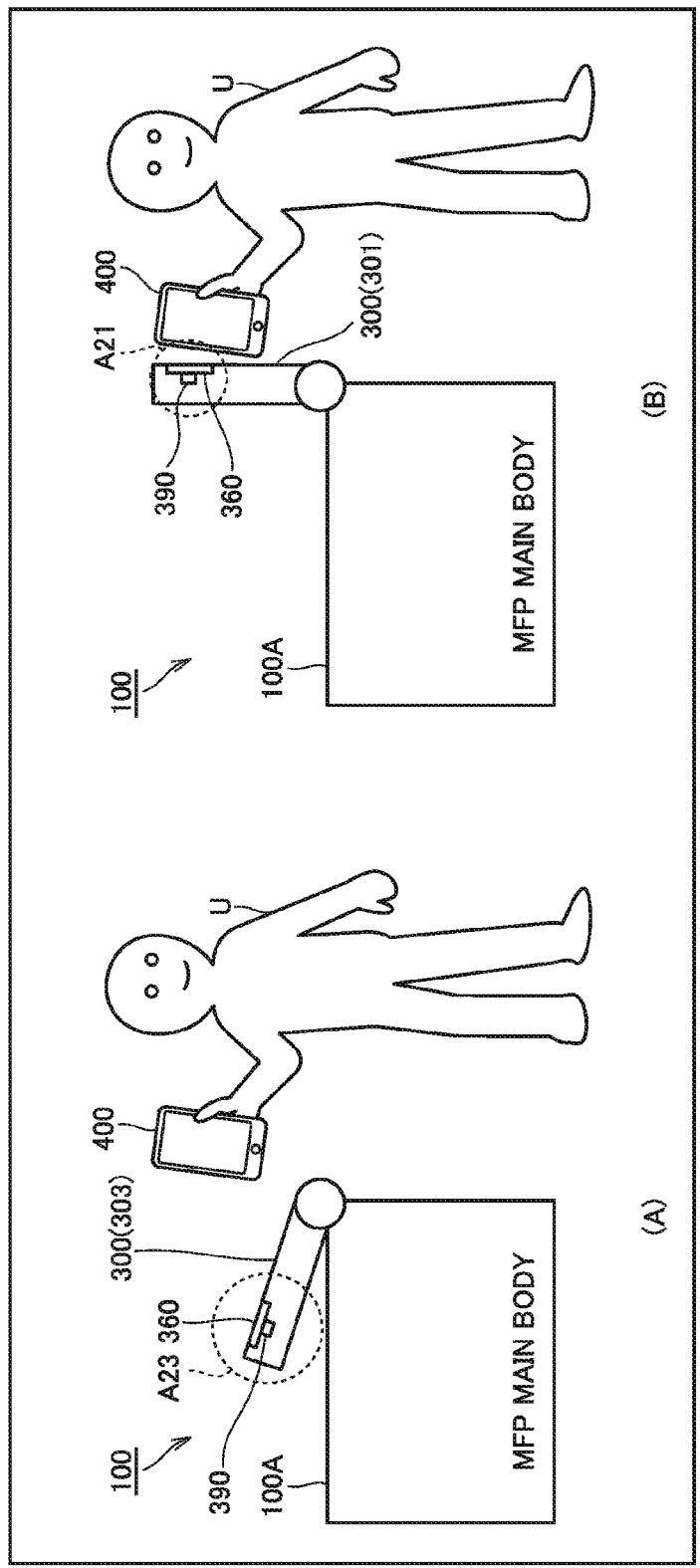
FIG. 5 is a diagram for more specifically illustrating control of coverage (communication distance) in near field communication in the MFP in the first embodiment.

FIG. 5 is a diagram for more specifically describing control of coverage (communication distance) in near field communication in MFP 100 in the first embodiment. FIG. 5 shows two states (states (A) and (B)). In state (A), an angle of operation panel 300 is set to substantially 30°. In state (B), an angle of operation panel 300 is set to substantially 90°. Coverage (communication distance) in near field communication in respective states is shown with dashed lines A23 and A21 as in FIG. 4. FIG. 5 shows a user U who passes by MFP 100 while the user carries portable terminal 400.

In state (A), portable terminal 400 carried by user U is not located within the range shown with dashed line A23. Thus, MFP 100 does not start near field communication with portable terminal 400 carried by the user who simply passes by MFP 100.

In state (B), near field communication portion 390 is located on the front side of MFP 100 as compared with state (A). When coverage in near field communication is set similarly to state (A) in state (B), MFP 100 may start near field communication with portable terminal 400 carried by user U who simply passes by MFP 100.

In state (B), however, as shown with dashed line A21, coverage in near field communication is set to be narrower than in state (A). Thus, in state (B) as well, MFP 100 does not start near field communication with portable terminal 400 carried by the user who simply passes by MFP 100.

<2. Appearance of MFP>

Figure 6:
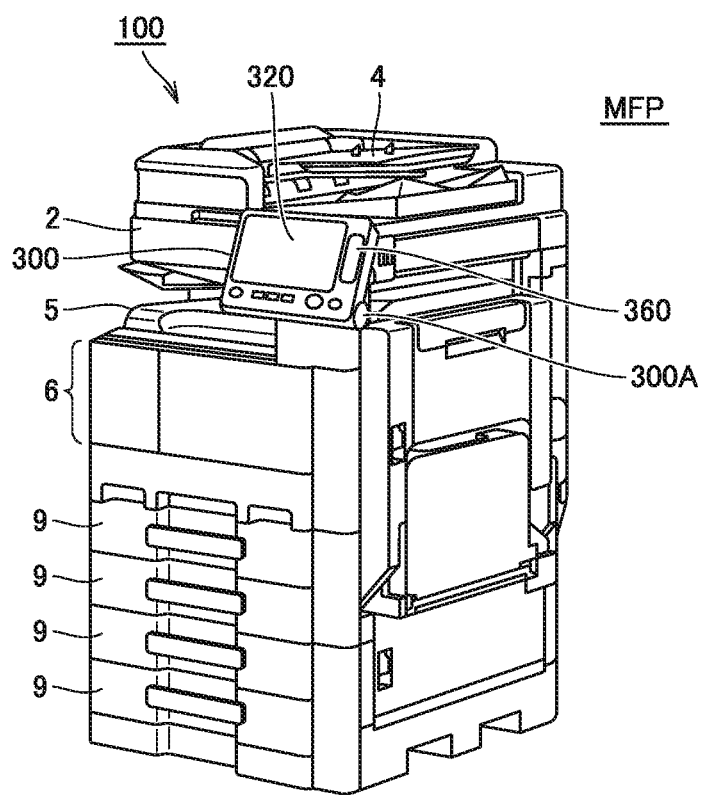
FIG. 6 is a diagram showing appearance of the MFP in the first embodiment.

FIG. 6 is a diagram showing appearance of MFP 100.

As shown in FIG. 6, MFP 100 includes a scanner portion 2 which obtains image data by optically reading a document and a print portion 6 which prints an image on paper based on the image data. A feeder 4 which sends a document to scanner portion 2 is arranged in an upper surface of the main body of MFP 100 representing an image formation apparatus. A plurality of paper feed portions 9 which supply paper to print portion 6 are arranged in a lower portion of MFP 100. A tray 5 to which paper having an image formed by print portion 6 is ejected is arranged in a central portion of MFP 100.

In MFP 100, operation panel 300 is attached on a front surface side in an upper portion of the main body of MFP 100. Operation panel 300 has an outer geometry substantially like a plate. In MFP 100, operation panel 300 is placed such that a main surface thereof is inclined with respect to a vertical direction as described with reference to FIGS. 3 and 4. Operation panel 300 may be provided with a mechanism for changing an angle of operation panel 300 in accordance with a state of a user (for example, a height of a user or whether or not a user sits on a wheelchair).

<3. Hardware Configuration of MFP>

Figure 7:
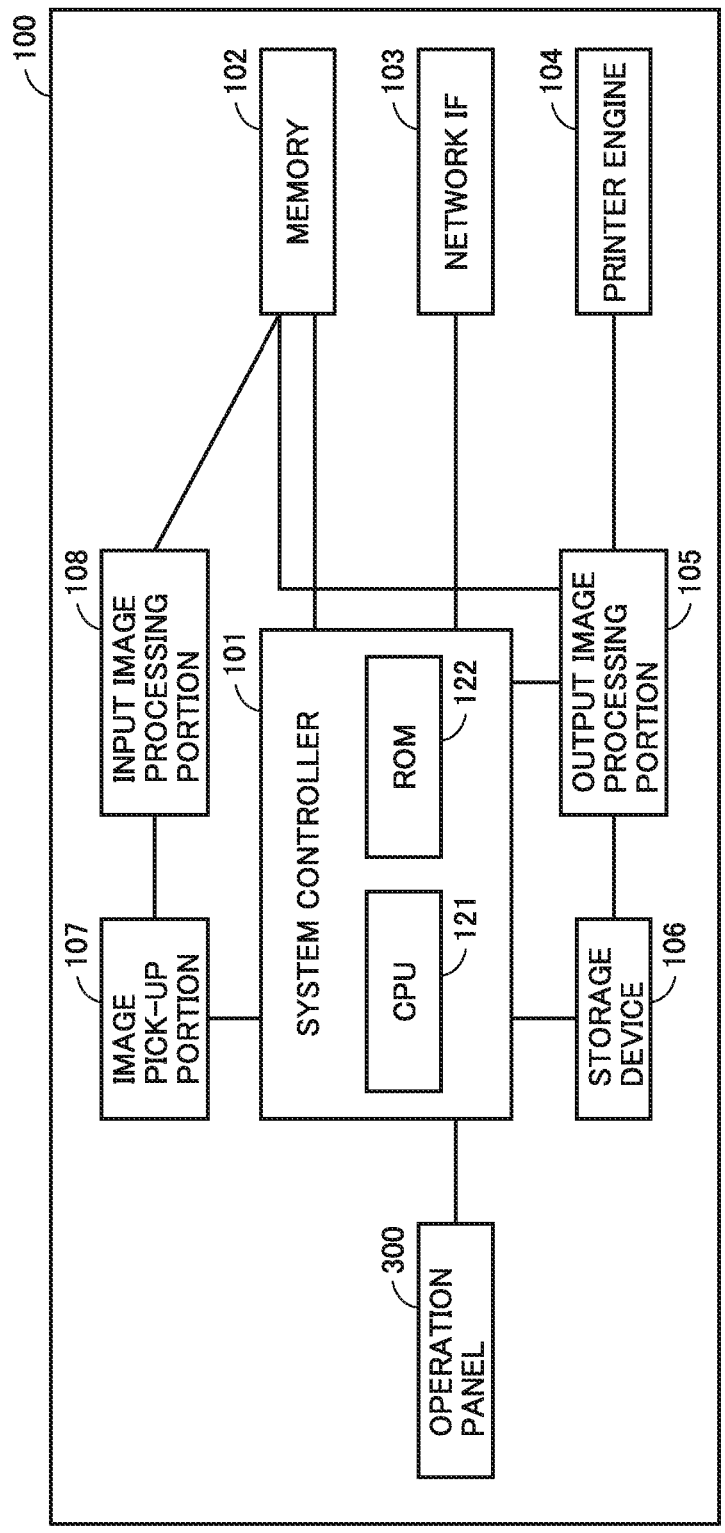
FIG. 7 is a block diagram showing a hardware configuration of the MFP in the first embodiment.

FIG. 7 is a block diagram showing a hardware configuration of MFP 100.

Referring to FIG. 7, MFP 100 includes a system controller 101, a memory 102, a network interface (I/F) 103, a printer engine 104, an output image processing portion 105, a storage device 106, an image pick-up portion 107, an input image processing portion 108, and operation panel 300. System controller 101 is connected to memory 102, network interface 103, printer engine 104, output image processing portion 105, storage device 106, image pick-up portion 107, input image processing portion 108, and operation panel 300, for example, through an internal bus.

System controller 101 controls entire MFP 100 for various jobs such as a scanning job, a copy job, a mail transmission job, and a print job. System controller 101 includes a central processing unit (CPU) 121 and a read only memory (ROM) 122. CPU 121 is one example of a hardware processor.

CPU 121 executes a control program stored in ROM 122. ROM 122 stores various programs for controlling an operation of MFP 100 and various types of fixed data. CPU 121 reads data from and writes data into memory 102 by performing prescribed processing.

Memory 102 is implemented, for example, by a random access memory (RAM), and used, for example, for temporary storage of data necessary for CPU 121 to execute a control program and image data.

Network interface 103 communicates with an external device through a network in response to an instruction from system controller 101.

Printer engine 104 performs processing for printing on paper based on print data processed by output image processing portion 105. In particular, when MFP 100 operates as a printer, printer engine 104 prints an image, and when MFP 100 operates as a copying machine, printer engine 104 prints an image read by image pick-up portion 107.

For example, in printing of an image, output image processing portion 105 performs conversion processing for converting a data format of the image into a data format for printing.

Storage device 106 is implemented, for example, by a hard disk drive (HDD), and stores various types of data relating to an operation of MFP 100. Storage device 106 may further store image data on a picture shown on operation panel 300 of MFP 100.

Image pick-up portion 107 reads an image of a document and outputs the image to input image processing portion 108.

Input image processing portion 108 performs conversion processing for converting a format of image data when an image is read by image pick-up portion 107.

In MFP 100, an operation of MFP 100 as described herein is implemented as CPU 121 executes an appropriate program. A program executed by CPU 121 may be stored in ROM 122 as described above, stored in storage device 106, or stored in a storage medium attachable to or removable from MVP 100. A storage medium storing the program is a medium storing data in a non-volatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (except for memory cards), an optical card, a mask ROM, an EPROM, an EEPROM (Electronically Erasable Programmable Read-Only Memory), and the like.

The program according to the present disclosure may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present disclosure.

The program according to the present disclosure may be provided in a manner incorporated as a part of another program. In such a case as well, the program itself does not include the module included in another program, but the program executes the processing in cooperation with another program. Such a program incorporated in another program may also be encompassed in the program according to the present disclosure.

The provided program product is installed in a program storing portion such as a hard disk for execution. It is noted that the program product includes the program itself and a recording medium recording the program.

<4. Configuration of Operation Panel>

Figure 8:
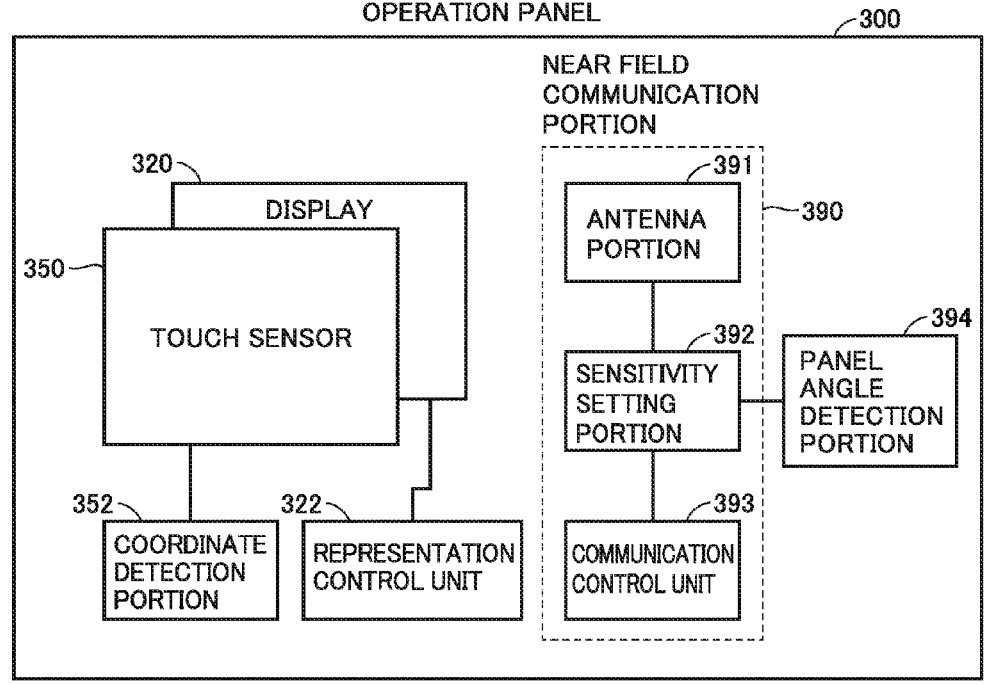
FIG. 8 is a diagram showing a block configuration including a portion made use of for control in the first embodiment, of the operation panel in the MFP in the first embodiment.

FIG. 8 shows a block configuration including a portion made use of for control in the first embodiment, of operation panel 300 in MFP 100.

As shown in FIG. 8, operation panel 300 includes a representation control unit 322, a coordinate detection portion 352, and a panel angle detection portion 394 in addition to display 320, touch sensor 350, and near field communication portion 390. Representation control unit 322, coordinate detection portion 352, and panel angle detection portion 394 are implemented, for example, as CPU 121 executes an appropriate program.

Representation control unit 322 controls a manner of representation on display 320.

Coordinate detection portion 352 specifies a position at which an operation has been performed on touch sensor 350. More specifically, a plurality of electrodes are arranged in matrix in touch sensor 350. Coordinate detection portion 352 is connected to the plurality of electrodes. Coordinate detection portion 352 specifies an amount of change in capacitance in touch sensor 350 by successively scanning a voltage value of each of the plurality of electrodes. Coordinate detection portion 352 specifies a position at which an operation has been performed on touch sensor 350 based on the specified amount of change in capacitance. Coordinate detection portion 352 outputs the thus specified position to system controller 101.

Panel angle detection portion 394 specifies an angle of operation panel 300. Panel angle detection portion 394 includes, for example, a member of which electrical or magnetic characteristics are changed in accordance with an angle of rotation of hinge 300A, and specifies an angle of operation panel 300 by making use of change in characteristics in the member. Panel angle detection portion 394 outputs the specified angle to near field communication portion 390.

Near field communication portion 390 includes an antenna portion 391, a sensitivity setting portion 392, and a communication control unit 393. Antenna portion 391 receives radio waves transmitted from a communication counterpart such as portable terminal 400, converts the radio waves into signals, and outputs the signals to communication control unit 393. Communication control unit 393 converts the signals output from antenna portion 391 into data which can be handled in MFP 100 and transmits the data to system controller 101. Sensitivity setting portion 392 located between antenna portion 391 and communication control unit 393 sets radio wave reception sensitivity of antenna portion 391 in accordance with the angle specified by panel angle detection portion 394. Namely, antenna portion 391 receives radio waves at sensitivity set by sensitivity setting portion 392.

<5. Adjustment of Reception Sensitivity in Near Field Communication Portion>

Figure 9:
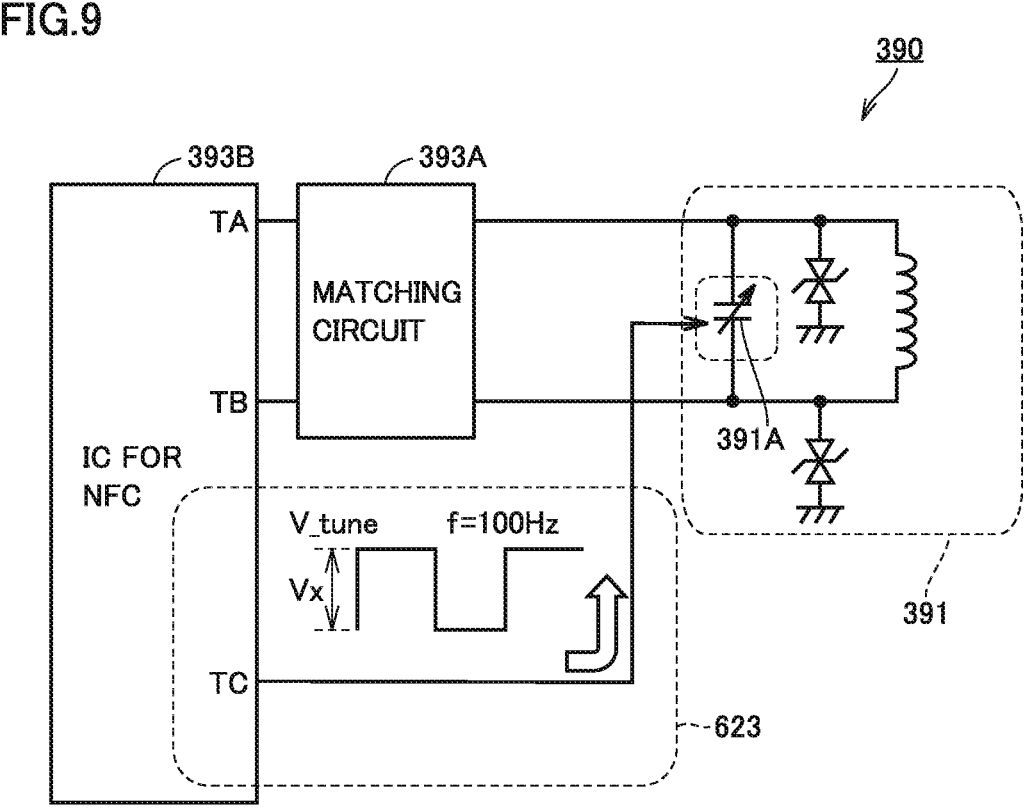
FIG. 9 is a diagram showing one example of a specific configuration of a near field communication portion in the first embodiment.

FIG. 9 is a diagram showing one example of a specific configuration of near field communication portion 390. In the configuration shown in FIG. 9, communication control unit 393 includes a matching circuit 393A and an integrated circuit (IC) for NFC 393B. A signal generated in antenna portion 391 is matched in matching circuit 393A and thereafter sent to IC for NFC 393B. IC for NFC 393B converts a signal output from antenna portion 391 into data which can be handled in MFP 100 and transmits the data to system controller 101.

Antenna portion 391 contains a variable capacitor 391A. In antenna portion 391, a resonant frequency for reception of radio waves is changed as a capacitance of variable capacitor 391A is adjusted. A capacitance of variable capacitor 391A is adjusted by IC for NFC 393B. IC for NFC 393B adjusts the capacitance of variable capacitor 391A to attain a capacitance in accordance with the angle output from panel angle detection portion 394.

In MFP 100 in the first embodiment, IC for NFC 393B which operates to convert a signal input through matching circuit 393A into data and send the signal to system controller 101 implements communication control unit 393 (FIG. 8). Communication control unit 393 further converts data output from system controller 101 into an appropriate signal and transmits the signal from antenna portion 391.

In MFP 100 in the first embodiment, IC for NFC 393B which operates to control a capacitance of variable capacitor 391A with a capacitance in accordance with an angle output from panel angle detection portion 304 implements sensitivity setting portion 392 (FIG. 8). Sensitivity setting portion 392 represents one example of adjustment means for adjusting a communication distance of communication means.

Information referred to by IC for NFC 393B for control of a capacitance is stored in storage device 106 (FIG. 7), for example, in a table format. FIG. 10 is a diagram showing one example of the information.

As shown in FIG. 10, the information referred to by IC for NFC 393B for control of a capacitance includes a "communication distance" for each angle of operation panel 300 (a "panel angle" in FIG. 10). A value for a capacitance corresponding to each communication distance is stored, for example, in storage device 106. IC for NFC 393B determines a capacitance of variable capacitor 391A, for example, by referring to the information shown in FIG. 10.

In MFP 100 in the first embodiment, with change in resonant frequency of antenna portion 391, sensitivity of antenna portion 391 of reception of radio waves at a frequency used in near field communication is changed. Namely, as the resonant frequency is distant from the frequency used in near field communication, reception sensitivity of antenna portion 391 lowers. Lowering in reception sensitivity of antenna portion 391 means narrower coverage in near field communication in MFP 100. Namely, in MFP 100, coverage (communication distance) in near field communication is changed as reception sensitivity of antenna portion 391 is changed.

The example described with reference to FIG. 9 represents one specific example of change in coverage (communication distance) in near field communication. Any other known technique can also be adopted for changing coverage (communication distance) in MFP 100.

<6. Hardware Configuration of Portable Terminal>

Figure 11:
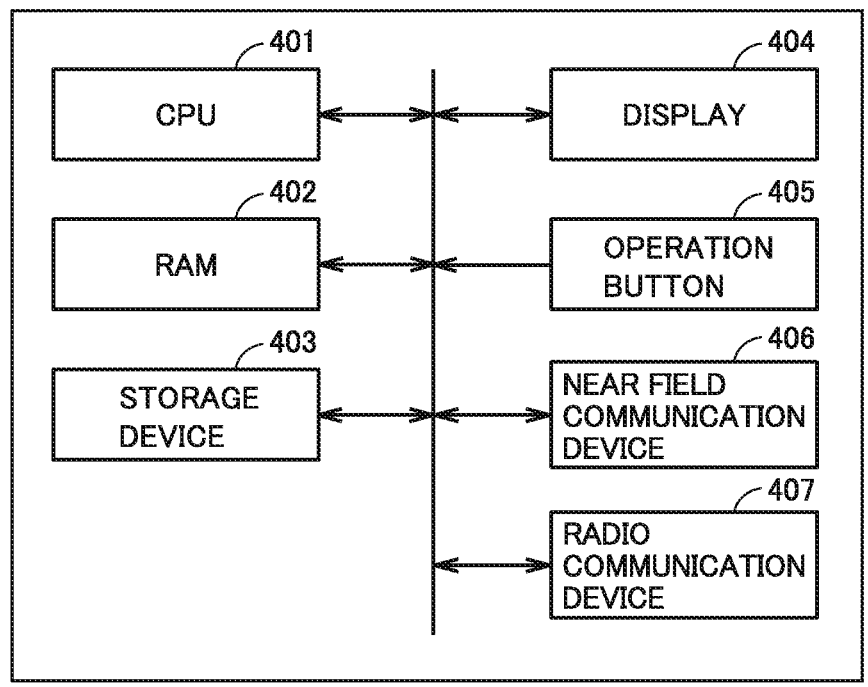
FIG. 11 is a diagram showing one example of a hardware configuration of a portable terminal representing one example of a communication counterpart in near field communication of the MFP.

FIG. 11 is a diagram showing one example of a hardware configuration of portable terminal 400 representing one example of a communication counterpart in near field communication of MFP 100.

As shown in FIG. 11, portable terminal 400 includes as main constituent elements, a CPU 401, a RAM 402, a storage device 403, a display 404, an operation button 405, a near field communication device 406, and a radio communication device 407. CPU 401, RAM 402, storage device 403, display 404, operation button 405, and near field communication device 406 are connected to one another through an internal bus.

CPU 401 represents one example of an arithmetic unit performing processing for controlling overall operations of portable terminal 400.

RAM 402 functions as a work area while CPU 401 performs processing.

Storage apparatus 403 saves data of various programs such as an operating system (OS) program and an application program executed by CPU 401 and data made use of for execution of such a program. Storage device 403 includes, for example, a medium storing data in a non-volatile manner such as an EEPROM. A program downloaded through a network may also be installed in storage device 403.

Display 404 is a display apparatus for displaying an image showing a result of processing of a program executed by CPU 401.

Operation button 405 represents one example of an input apparatus for inputting information into portable terminal 400 such as input of an instruction for processing of an application being executed. A touch sensor provided on display 404 represents another example of an input apparatus included in portable terminal 400.

Near field communication device 406 represents one example of a communication device for near field communication such as NFC.

Radio communication device 407 represents one example of a communication device for radio communication such as Bluetooth®.

<7. Practical Example>

Figure 12:
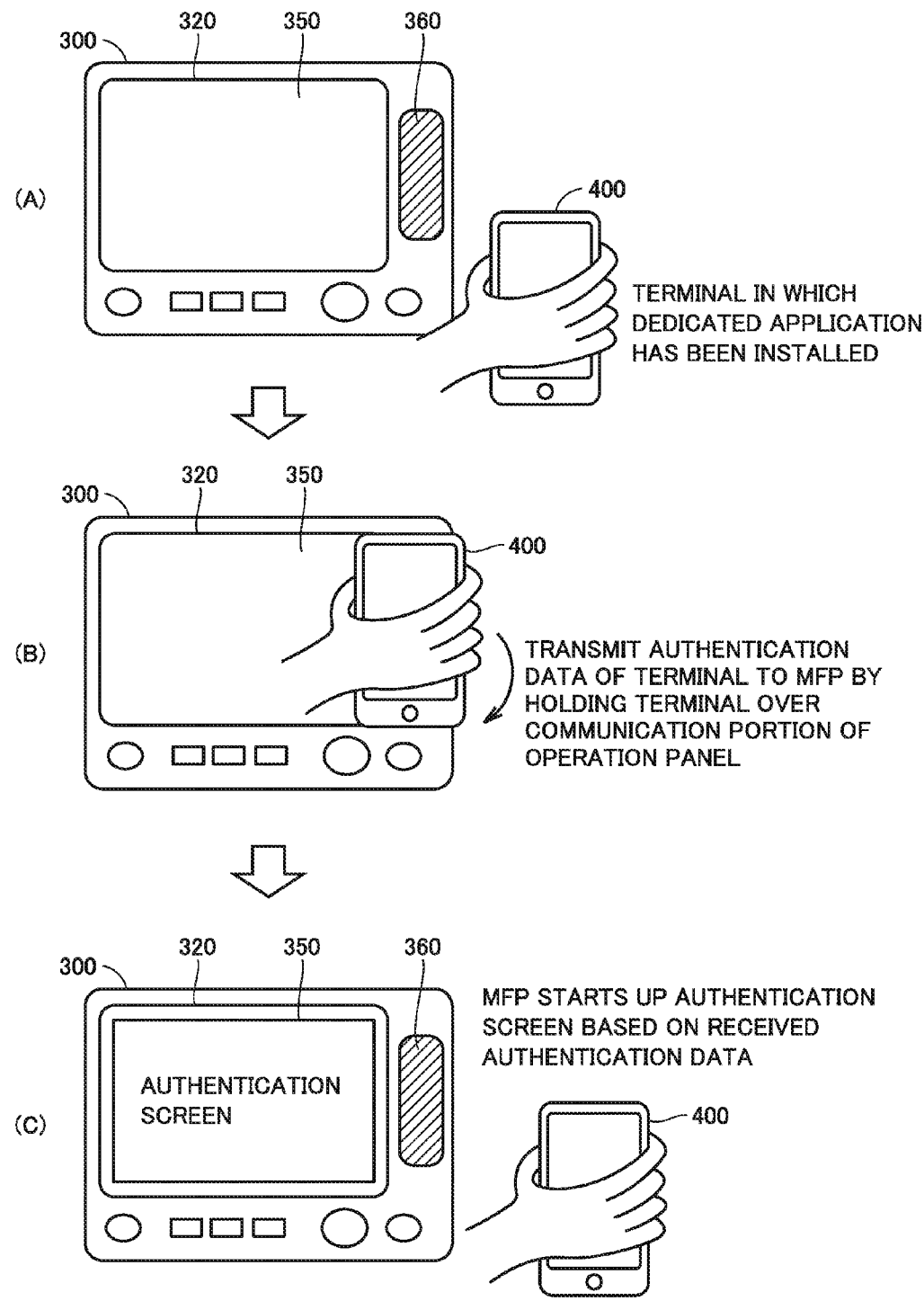
FIG. 12 is a diagram for illustrating one example of processing performed by the MFP through near field communication with the portable terminal.

FIG. 12 is a diagram for illustrating one example of processing performed by MFP 100 through near field communication with portable terminal 400. Processing for authentication of portable terminal 400 by MFP 100 represents one example of the processing. An application for authenticating a terminal (hereinafter an "application for authentication") is installed in MFP 100. An application for sending data for authentication stored in portable terminal 400 (hereinafter an "application for notification") to MFP 100 in response to a request from an application on an MFP side is installed in portable terminal 400.

FIG. 12 shows three states (A), (B), and (C). A user initially brings portable terminal 400 closer to touch area 360 as shown with state (A). When portable terminal 400 is held over touch area 360 as shown with state (B), near field communication is established between MFP 100 and portable terminal 400.

When near field communication is established, CPU 121 of MFP 100 instructs portable terminal 400 to start up the application for notification. CPU 401 of portable terminal 400 thus starts up the notification application.

CPU 121 of MFP 100 further instructs portable terminal 400 to transmit data for authentication. In response, CPU 401 of portable terminal 400 transmits data for authentication (for example, an ID and a password) stored in storage device 403 to MFP 100 as processing in accordance with the application for notification.

CPU 121 of MFP 100 verifies the data for authentication received from portable terminal 400. When CPU 121 determines that authentication has been successful, it has display 320 display success of authentication as shown with state (C). CPU 121 controls an operation of MFP 100 in a manner directed to an approved user. For example, permission of viewing of a confidential document stored in storage device 106 represents one example of such an operation. Namely, when viewing of the document is indicated, CPU 121 has display 320 display the document.

In the first embodiment described above, a communication distance of near field communication portion 390 is controlled in accordance with a position of near field communication portion 390. Thus, the user can start near field communication between MFP 100 and portable terminal 400 by holding portable terminal 400 over the touch area as shown in FIG. 12. Start of near field communication between MFP 100 and portable terminal 400 at the time when the user who carries portable terminal 400 simply passes by MFP 100 as shown in FIG. 5 can be avoided.

Second Embodiment

<1. Overview>

A hardware configuration of MFP 100 in a second embodiment can be the same as in the first embodiment unless otherwise specified. In MFP 100 in the second embodiment, operation panel 300 is attachable to and removable from main body 100A of MFP 100. MFP 100 has a plurality of slots for attaching operation panel 300 and each slot is provided with a connector for electrical connection between operation panel 300 and system controller 101.

<2. Appearance of MFP>

Figure 13:
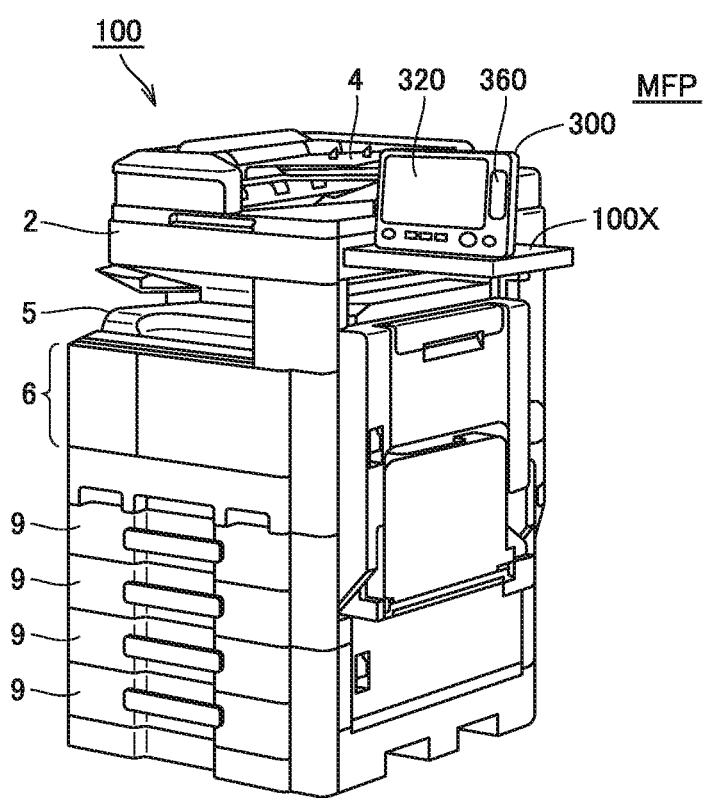
FIG. 13 is a diagram showing appearance of the MFP in a second embodiment.

FIG. 13 shows appearance of MFP 100 in the second embodiment. As compared with the appearance of MFP 100 in the first embodiment shown in FIG. 6, MFP 100 in the second embodiment includes a placement base 100X for placing operation panel 300. Operation panel 300 is placed on placement base 100X such that display 320 faces forward in MFP 100.

Figure 14:
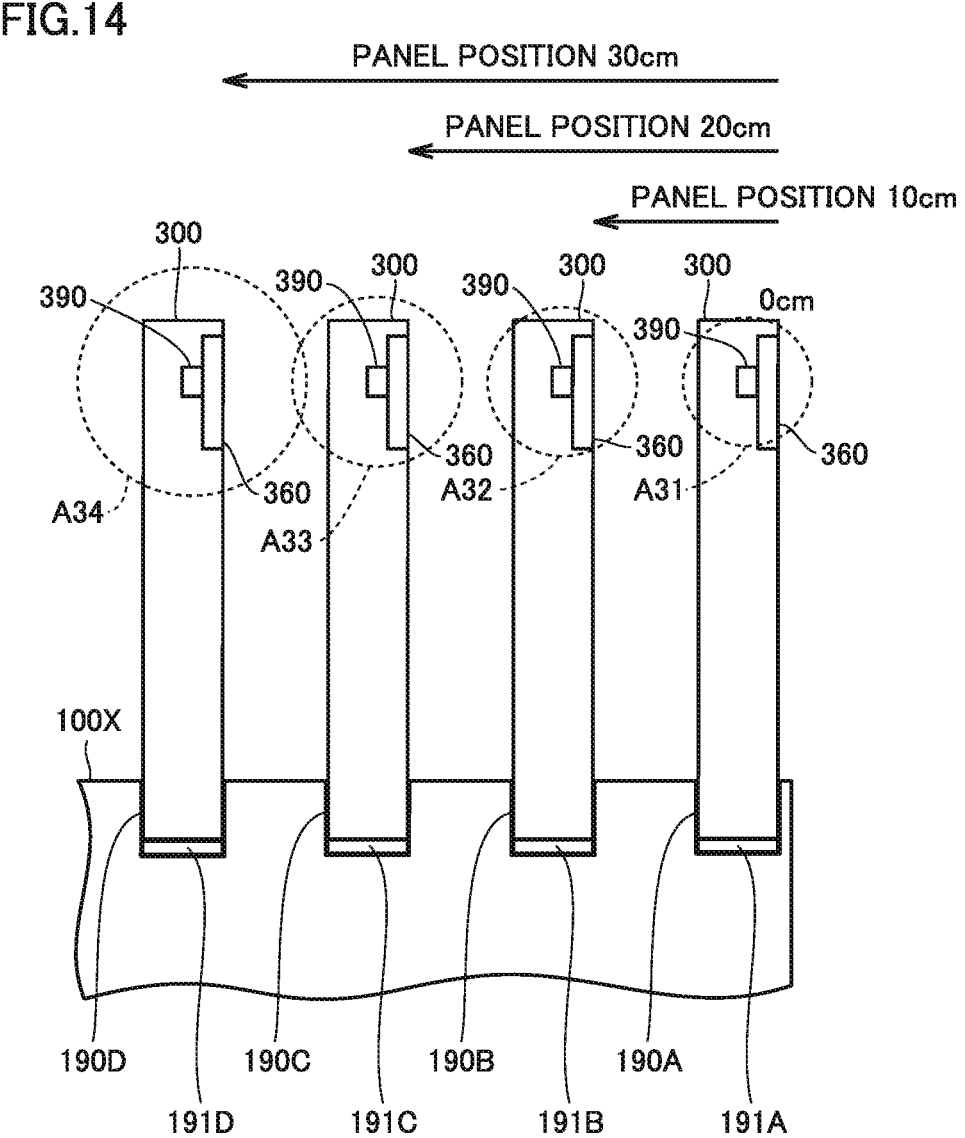
FIG. 14 is a diagram for illustrating a manner of placement of the operation panel on a placement base for the MFP in the second embodiment.

FIG. 14 is a diagram for illustrating a manner of placement of operation panel 300 on placement base 100X in MFP 100 in the second embodiment. Referring to FIG. 14, placement base 100X has four slots 190A, 190B, 190C, and 190D. Connectors 191A, 191B, 191C, and 191D are placed in slots 190A, 190B, 190C, and 190D, respectively. A connector is provided also in a bottom portion of operation panel 300.

The right side of FIG. 14 shows the front side of MFP 100. In MFP 100 in the second embodiment, operation panel 300 is placed in any of slots 190A, 190B, 190C, and 190D. When operation panel 300 is placed in any of slots 190A, 190B, 190C, and 190D, operation panel 300 is electrically connected to system controller 101 as the connector at the bottom portion thereof is connected to any of connectors 191A, 191B, 191C, and 191D.

In the second embodiment, sensitivity setting portion 392 (FIG. 8) sets radio wave reception sensitivity of near field communication portion 390 depending on in which of slots 190A, 190B, 190C, and 190D operation panel 300 is placed. More specifically, when operation panel 300 is placed in slot 190A which is located foremost in MFP 100 among slots 190A, 190B, 190C, and 190D, lowest reception sensitivity is set, and when operation panel 300 is placed in rearmost slot 190D in MFP 100, highest reception sensitivity is set. Panel angle detection portion 394 (FIG. 8) specifies a position of placement of operation panel 300 by detecting to which of connectors 191A, 191B, 191C, and 191D the connector of operation panel 300 is connected.

FIG. 14 shows coverage by near field communication portion 390 with dashed lines A31 to A34 at the time when the operation panel is placed in slots 190A, 190B, 190C, and 190D. For example, coverage by near field communication portion 390 at the time when operation panel 300 is placed in slot 190A is shown with dashed line A31.

FIG. 15 is a diagram showing one example of information made use of by panel angle detection portion 394 for setting of reception sensitivity. A table shown in FIG. 15 is stored, for example, in storage device 106. In the table shown in FIG. 15, a communication distance of near field communication portion 390 is associated with each position of placement of operation panel 300 (a panel position).

A communication distance (coverage) is changed, for example, as a capacitance of variable capacitor 391A is changed as described with reference to FIG. 9. Information for specifying a capacitance of variable capacitor 391A in accordance with each communication distance in FIG. 15 is stored, for example, in storage device 106. Panel angle detection portion 394 adjusts reception sensitivity of near field communication portion 390 in accordance with the table shown in FIG. 15 by referring to the information.

<3. Specific Description of Content of Control in Accordance with Position of Placement of Operation Panel>

Figure 16:
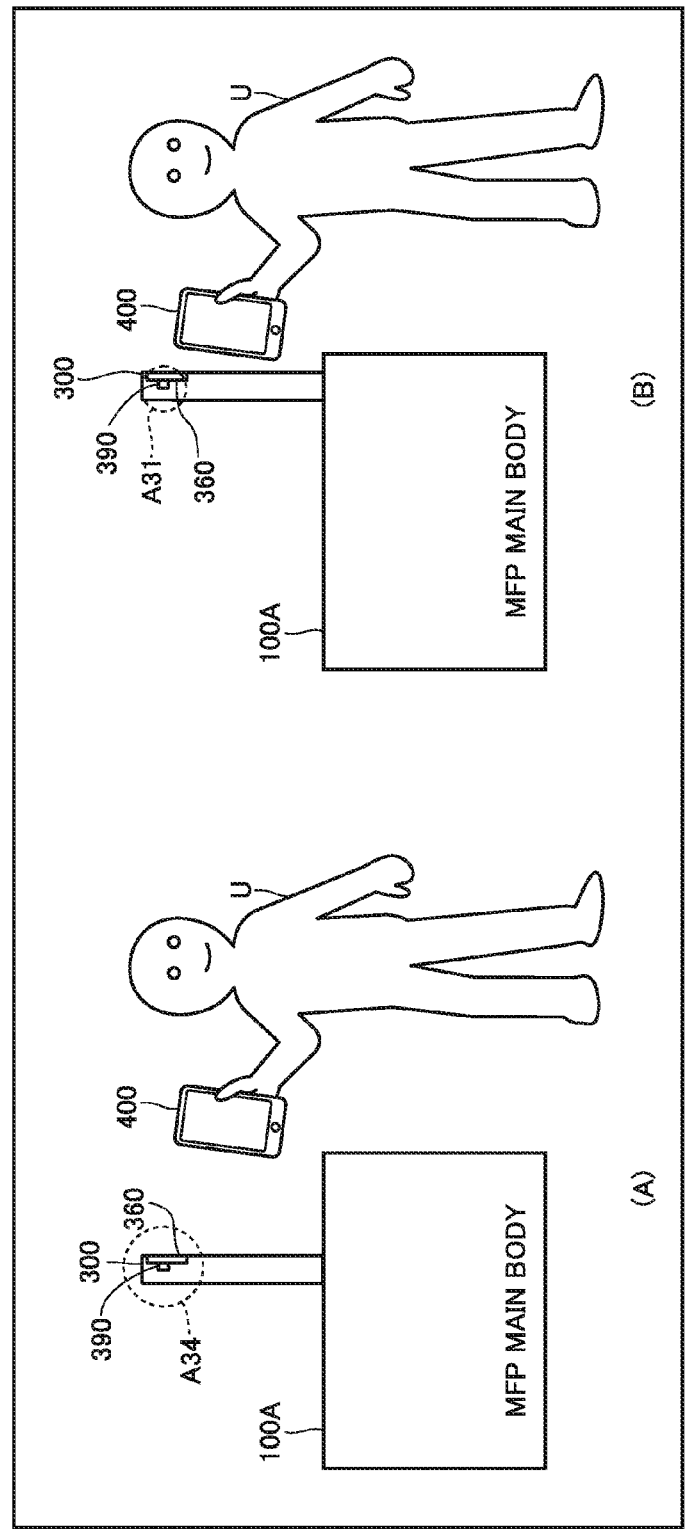
FIG. 16 is a diagram for more specifically illustrating control of coverage (communication distance) in near field communication in the MFP in the second embodiment.

FIG. 16 is a diagram for more specifically illustrating control of coverage (communication distance) in near field communication in MFP 100 in the second embodiment. FIG. 16 shows two states (states (A) and (B)). In state (A), operation panel 300 is placed in slot 190D (FIG. 14). In state (B), operation panel 300 is placed in slot 190A (FIG. 14). Coverage (communication distance) in near field communication in respective states is shown with dashed lines A34 and A31 as in FIG. 4.

FIG. 16 shows user U who passes by MFP 00 while the user carries portable terminal 400.

In state (A), portable terminal 400 carried by user U is not located in a range shown with dashed line A34. Thus, MFP 100 does not start near field communication with portable terminal 400 carried by the user who simply passes by MFP 100.

In state (B), near field communication portion 390 is located on the front side of MFP 100 as compared with state (A). When coverage in near field communication is set similarly to state (A) (the range shown with dashed line A34) in state (B), MFP 100 may start near field communication with portable terminal 400 carried by user U who simply passes by MFP 100.

In state (B), however, as shown with dashed line A31, coverage in near field communication is set to be narrower than in state (A). Namely, in state (B), coverage in near field communication is set to a range shown with dashed line A31 narrower than the range shown with dashed line A34. Thus, in state (B) as well, MFP 100 does not start near field communication with portable terminal 400 carried by the user who simply passes by MFP 100.

In the second embodiment described above, a case that operation panel 300 is attached in any of the plurality of slots 190A to 190D disposed in a front-rear direction of MFP 100 has been described. In MFP 100 in the second embodiment, radio wave reception sensitivity of near field communication portion 390 is changed in accordance with a position of near field communication portion 390 in operation panel 300. In MFP 100 in the second embodiment as well, as in the first embodiment, near field communication is established between MFP 100 and portable terminal 400 as shown in FIG. 12.

Thus, MFP 100 in the second embodiment does not establish, against the user's intention, near field communication with portable terminal 400 carried by the user who simply passes by MFP 100 as shown in FIG. 16. On the other hand, as shown in FIG. 5, the user can establish near field communication between MFP 100 and portable terminal 400 simply by bringing portable terminal 400 closer to touch area 360.

Third Embodiment

A hardware configuration of MFP 100 in a third embodiment can be the same as in the first embodiment unless otherwise specified. In MFP 100 in the third embodiment, operation panel 300 pivots around a vertically extending hinge.

Figure 17:
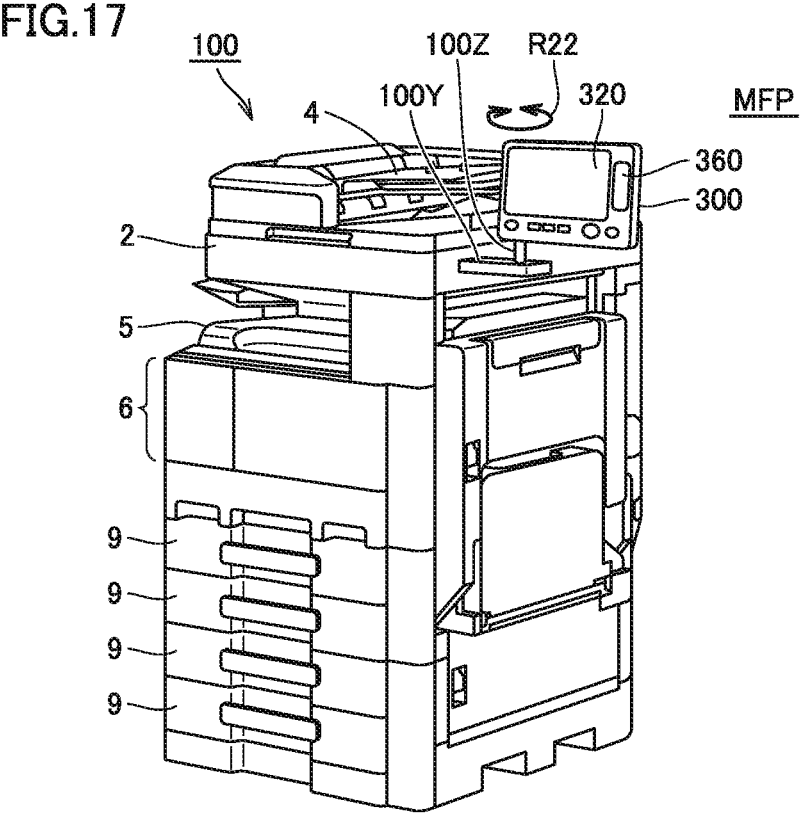
FIG. 17 is a diagram showing appearance of the MFP in a third embodiment.

FIG. 17 is a diagram showing appearance of MFP 100 in the third embodiment.

MFP 100 shown in FIG. 17 includes an attachment base 100Y and a shaft 100Z as compared with MFP 100 having hinge 300A in the first embodiment shown in FIG. 6. Attachment base 100Y is fixed to the main body of MFP 100. Shaft 100Z is fixed to be rotatable with respect to attachment base 100Y. Operation panel 300 is fixed to shaft 100Z. In the third embodiment, operation panel 300 can rotate with rotation of shaft 100Z in a direction of rotation shown with a double-headed arrow R22, that is, in a direction of rotation in a horizontal plane.

As operation panel 300 rotates in the direction of rotation shown with double-headed arrow R22, a position of near field communication portion 390 (see FIG. 3) in operation panel 300 is changed in a direction of depth of MFP 100. In MFP 100, operation panel 300 is arranged on one side of main body 100A. The one side is defined as the front surface of MFP 100. The direction of depth of MFP 100 is, for example, a direction from the one side toward the other side.

In MFP 100 in the third embodiment, operation panel 300 has components shown in FIG. 8. In the third embodiment, panel angle detection portion 394 obtains an angle of rotation of operation panel 300. Panel angle detection portion 394 specifies an amount of movement of near field communication portion 390 in the direction of depth of MFP 100 which corresponds to the angle of rotation. Panel angle detection portion 394 sets radio wave reception sensitivity of near field communication portion 390 in accordance with the amount of movement.

In the third embodiment described above, even when operation panel 300 is pivoted around the shaft extending along the vertical direction, radio wave reception sensitivity of near field communication portion 390 is controlled in accordance with a position of near field communication portion 390 in the direction of depth of MFP 100.

Fourth Embodiment

<1. Overview>

Figure 18:
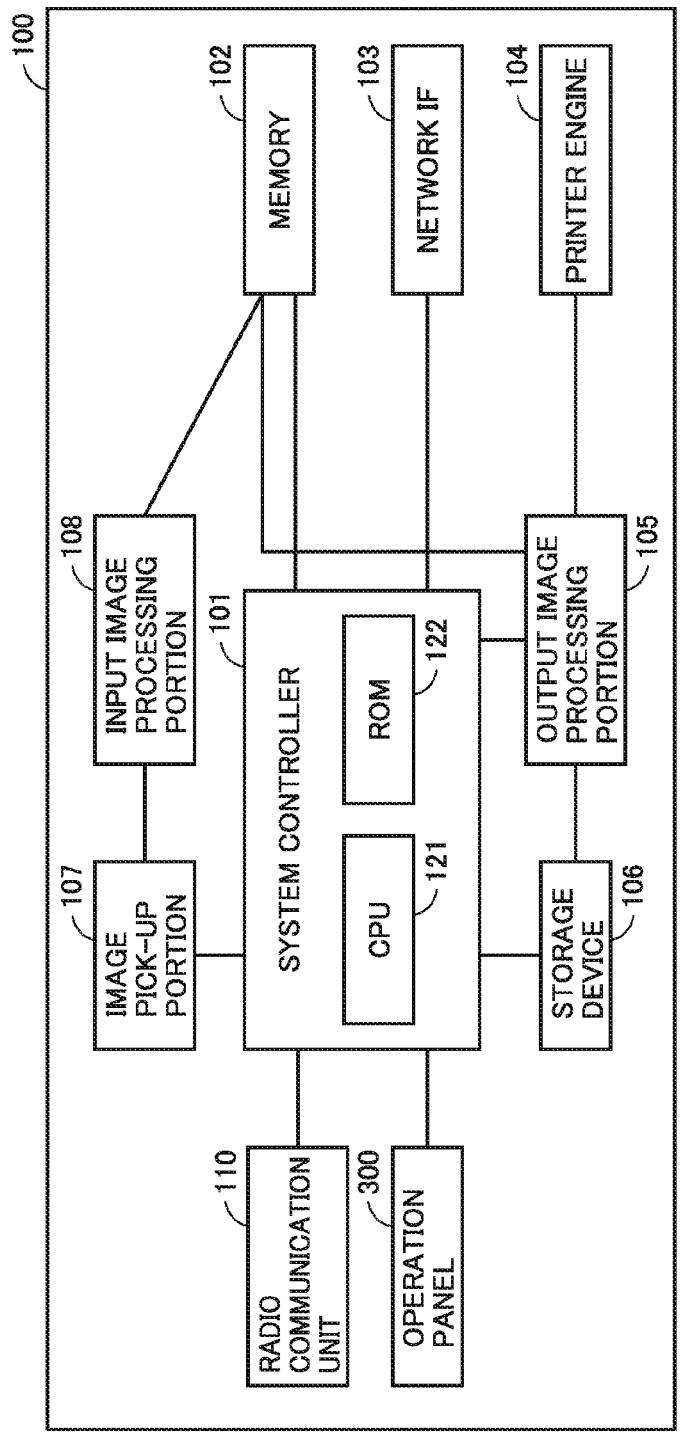
FIG. 18 is a diagram showing one example of a hardware configuration of the MFP in a fourth embodiment.

A hardware configuration of MFP 100 in a fourth embodiment is, for example, as shown in FIG. 18. As shown in FIG. 18, MFP 100 in the fourth embodiment further includes a radio communication unit 110 in addition to the components included in MFP 100 (see FIG. 7) in the first embodiment.

Radio communication unit 110 includes elements for radio communication. Communication under two types of communication schemes is herein distinguished by using terms "radio communication" and "near field communication." "Radio communication" refers to communication under such a scheme as Bluetooth and means communication of which communication distance is approximately several m. Radio communication unit 110 performs a communication operation for "radio communication." On the other hand, a term "near field communication" is used for communication realized by near field communication portion 390 under such a scheme as NFC in which a communication distance is approximately 10 cm.

In MFP 100 in the fourth embodiment, whether or not to activate communication through near field communication portion 390 is determined based on a position in the direction of depth of MFP 100. More specifically, in MFP 100 in the fourth embodiment, when near field communication portion 390 is located on the relatively front side of MFP 100, communication through near field communication portion 390 is inactivated, and when near field communication portion 390 is located on the relatively rear side of MFP 100, communication through near field communication portion 390 is activated.

Figure 19:
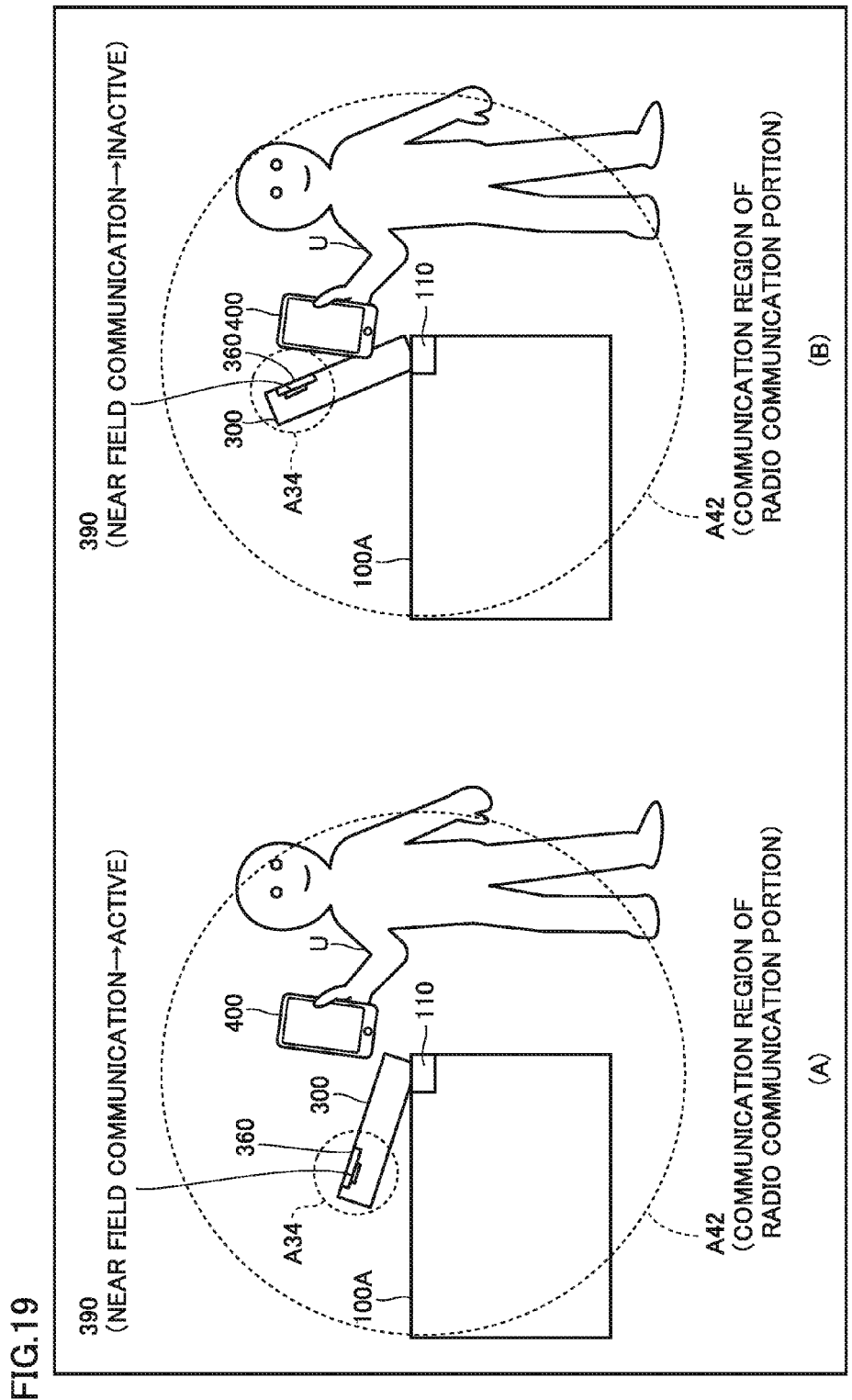
FIG. 19 is a diagram showing overview of control in the MFP in the fourth embodiment.

FIG. 19 is a diagram showing overview of control in MFP 100 in the fourth embodiment. FIG. 19 shows two states (states (A) and (B)) and shows user U who passes by MFP 100 while the user carries portable terminal 400. In FIG. 19, a dashed line A42 shows coverage by radio communication unit 110. Dashed line A34 represents coverage by near field communication portion 390.

In state (A), an angle of inclination of the main surface of operation panel 300 with respect to a horizontal plane is approximately 30°. On the other hand, an angle of inclination in state (B) is approximately 60°.

In state (B), near field communication portion 390 is located on the front side of MFP 100 as compared with state (A). In MFP 100 in the fourth embodiment, though communication through near field communication portion 390 is active in state (A), communication is inactivated in state (B).

In state (A), portable terminal 400 carried by user U is not located in the range shown with dashed line A34. Thus, MFP 100 does not start near field communication with portable terminal 400 carried by the user who simply passes by MFP 100.

In state (B), portable terminal 400 carried by user U may be located in the range shown with dashed line A34. Thus, if near field communication is activated in state (B), MFP 100 may start near field communication with portable terminal 400 carried by the user who simply passes by MFP 100.

In state (B), however, near field communication is inactivated. Thus, in state (B) as well, MFP 100 does not start near field communication with portable terminal 400 carried by the user who simply passes by MFP 100.

MFP 100 can communicate under the two types of schemes of radio communication and near field communication. Dashed line A42 shows coverage by radio communication unit 110. In MFP 100 in the fourth embodiment, radio communication is activated in any of states (A) and (B).

MFP 100 in the fourth embodiment may activate near field communication when an instruction to activate near field communication is input through operation panel 300 even though near field communication has once been inactivated.

<2, Position Which Can Be Taken by Operation Panel>

Figure 20:
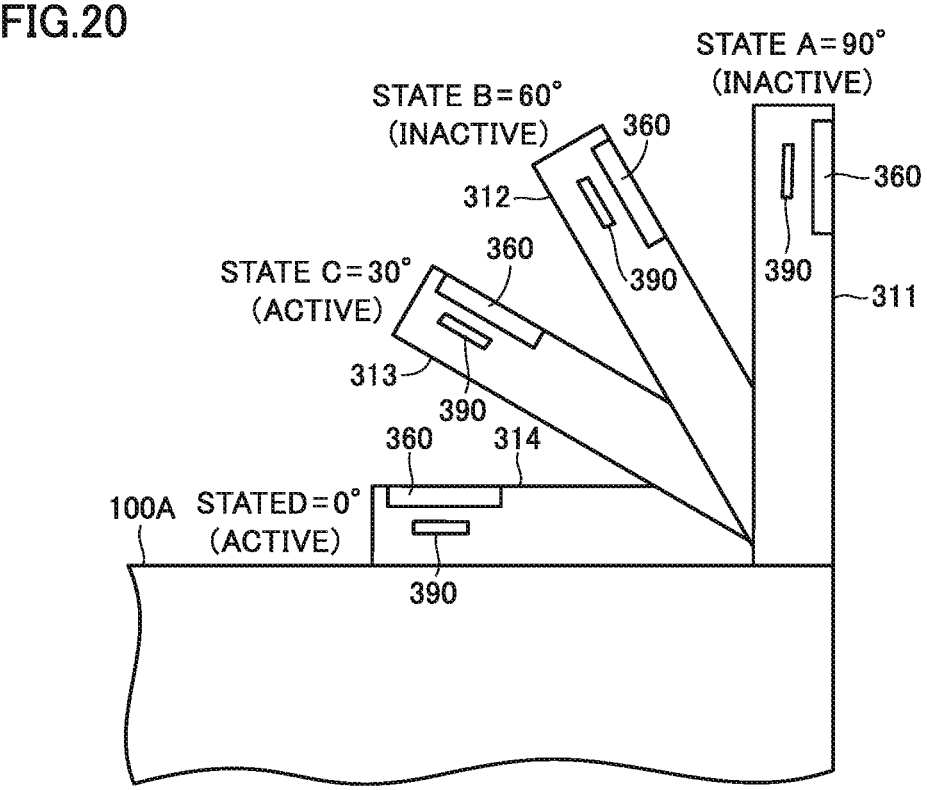
FIG. 20 is a diagram showing a state of near field communication in accordance with a position of the operation panel in the fourth embodiment.

FIG. 20 is a diagram showing a state of near field communication in accordance with a position of operation panel 300. FIG. 20 shows four positions of operation panel 300 as positions 311 to 314, respectively. States corresponding to positions 311, 312, 313, and 314 are called a state A, a state B, a state C, and a state D, respectively. In four states A to D, an angle of the main surface of operation panel 300 with respect to the horizontal plane is different. Specifically, angles of the main surface in state A, state B, state C, and state D are 90°, 60°, 30°, and 0°, respectively.

In the fourth embodiment, in two states (states A and B) in which near field communication portion 390 is located on the front side among states A to D, near field communication is inactivated. On the other hand, in two states (states C and D) in which near field communication portion 390 is located on the rear side among states A to D, near field communication is activated.

<3. Configuration of Operation Panel>

Figure 21:
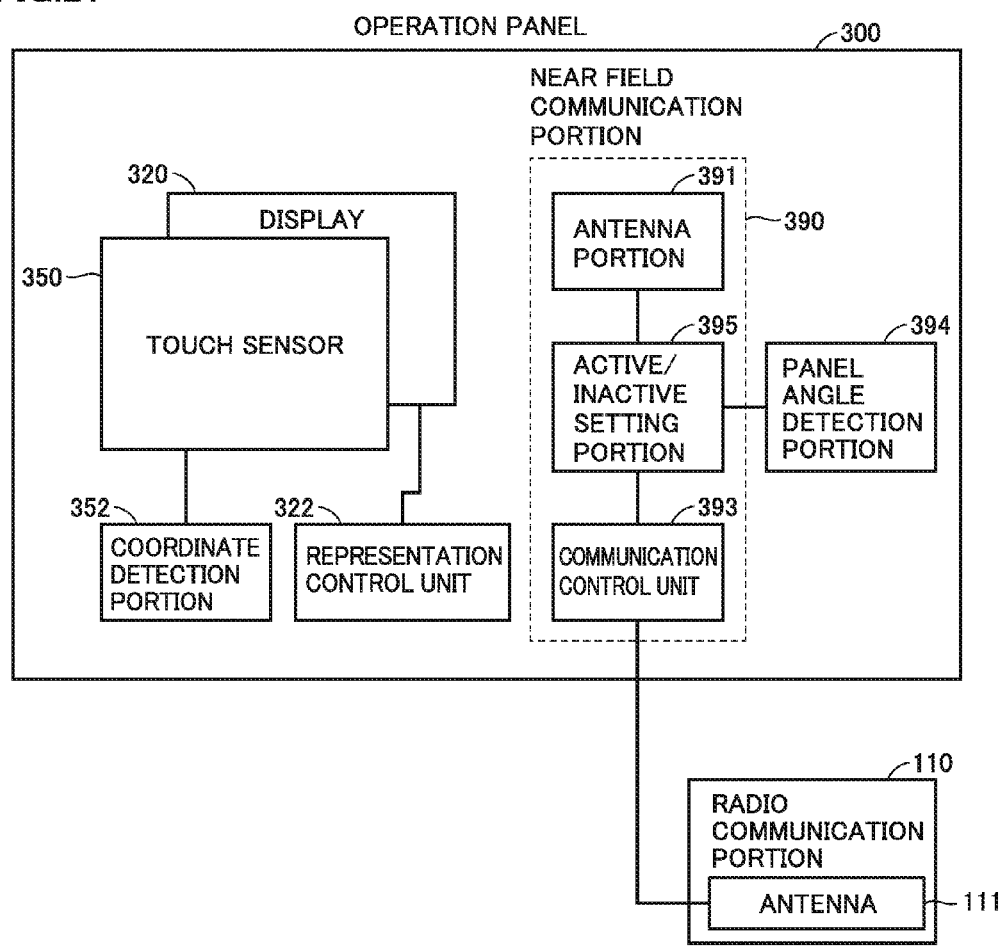
FIG. 21 is a diagram showing a configuration of the operation panel in the MFP in the fourth embodiment.

FIG. 21 is a diagram showing a configuration of operation panel 300 in MFP 100 in the fourth embodiment. Operation panel 300 in the fourth embodiment includes an active/inactive setting portion 395 instead of sensitivity setting portion 392, as compared with operation panel 300 in the first embodiment shown in FIG. 8.

Active/inactive setting portion 395 switches between active and inactive of near field communication in MFP 100 in accordance with an angle of operation panel 300 detected by panel angle detection portion 394. Relation between an angle of operation panel 300 and active/inactive of near field communication is, for example, as shown in FIG. 20.

When active/inactive setting portion 395 inactivates near field communication, in spite of reception of radio waves from portable terminal 400 by antenna portion 391, communication control unit 393 does not allow transmission of data corresponding to the radio waves to system controller 101 (FIG. 7).

Active/inactive setting portion 395 refers, for example, to a table shown in FIG. 22 in controlling switching between active and inactive of near field communication. The table in FIG. 22 associates each angle of operation panel 300 ("panel angle") with information specifying a state (active/inactive) of near field communication and information specifying a state (active/inactive) of radio communication. The table in FIG. 22 is stored, for example, in storage device 106 (FIG. 7).

Radio communication unit 110 includes an antenna 111 which receives radio waves for radio communication. In radio communication, radio communication unit 110 converts a signal received by antenna 111 into data which can be handled in MFP 100 and outputs the data to system controller 101. On the other hand, when active/inactive setting portion 395 indicates inactivation of radio communication, radio communication unit 110 does not output data corresponding to radio waves to system controller 101 even though antenna 111 receives radio waves.

<4. Flow of Processing>

Figure 23:
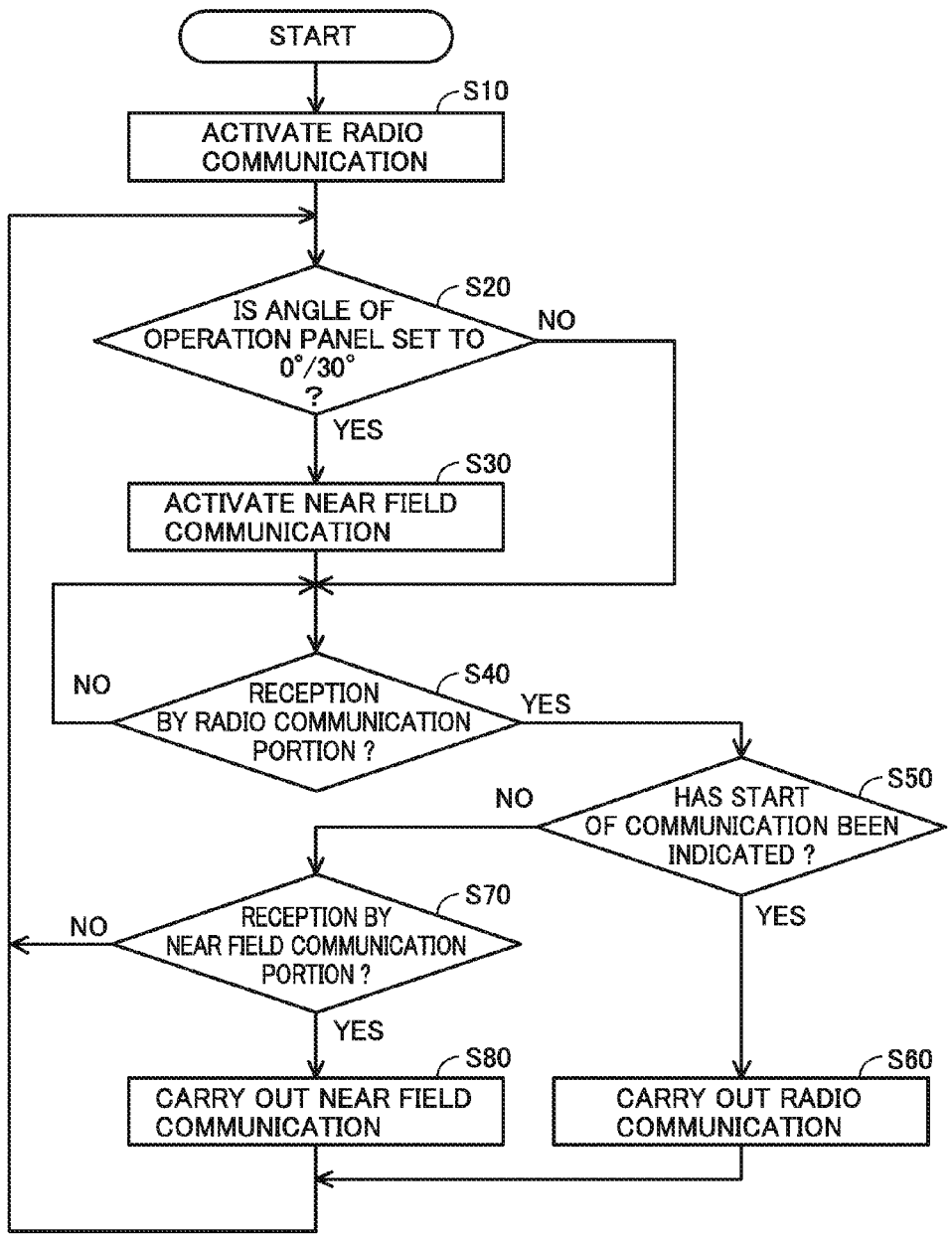
FIG. 23 is a flowchart of processing performed for switching between states (active/inactive) of near field communication in the MFP in the fourth embodiment.

FIG. 23 is a flowchart of processing performed for switching between the states (active/inactive) of near field communication in MFP 100 in the fourth embodiment. Processing in FIG. 23 is performed, for example, at the time when MFP 100 is started up and an angle of operation panel 300 is changed.

Referring to FIG. 23, in step S10, CPU 121 activates radio communication in MFP 100. Thereafter, control proceeds to step S20.

In step S20, CPU 121 determines whether or not an angle of operation panel 300 is set to 0° (state D in FIG. 20) or 30° (state C in FIG. 20). When CPU 121 determines that an angle of operation panel 300 is set to 0° or 30° (YES in step S20), control proceeds to step S30. When CPU 121 determines that an angle of operation panel 300 is set to 60° or 90° (NO in step S20), control proceeds to step S40.

In step S30, CPU 121 activates near field communication in MFP 100. Thereafter, control proceeds to step S40.

In step S40, CPU 121 determines whether or not antenna 111 has received radio waves for radio communication. When CPU 121 determines that antenna 111 has received radio waves for radio communication (YES in step S40), control proceeds to step S50. When CPU 121 determines that antenna 111 has not received radio waves for radio communication (NO in step S40), control remains at step S40.

In step S50, CPU 121 determines whether or not an instruction to establish radio communication has been input to operation panel 300. When CPU 121 determines that the instruction has been input (YES in step S50), control proceeds to step S60. When CPU 121 determines that the instruction has not been input (NO in step S50), control proceeds to step S70.

In step S60, CPU 121 carries out radio communication by establishing radio communication. Thereafter, control returns to step S10.

According to control in steps S50 and S60, when the user enters an area in which radio communication can be established, radio communication is established on condition that the user has confirmed establishment of radio communication. Thus, in step S50, information for requesting permission of establishment of radio communication is preferably displayed on display 320 of operation panel 300. As the user sees such a representation, the user can input an "instruction to establish radio communication" as described above (for example, touch an OK button).

In step S70, CPU 121 determines whether or not antenna portion 391 has received radio waves in near field communication. When CPU 121 determines that antenna portion 391 has received radio waves for near field communication (YES in step S70), control proceeds to step S80. When CPU 121 determines that antenna portion 391 has not received radio waves for near field communication (NO in step S70), control returns to step S10.

In step S80, CPU 121 carries out near field communication on condition that near field communication has been activated. Thereafter, control returns to step S10. When near field communication has been inactivated, control returns to step S10 without carrying out near field communication.

In the fourth embodiment described above, near field communication is inactivated when near field communication portion 390 is located on the front side of MFP 100. Thus, start, against the user's intention, of near field communication by MFP 100 with portable terminal 400 carried by the user who has simply passed by MFP 100 is avoided. When the user inputs information for activating near field communication to operation panel 300 after near field communication has been inactivated, near field communication is activated in MFP 100. When MFP 100 has been set to activate near field communication regardless of an angle of operation panel 300, near field communication of MFP 100 is activated regardless of an angle of operation panel 300.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An image processing apparatus capable of near field communication with a terminal, comprising:
    an operation panel attached to a main body of the image processing apparatus so as to be variable in position relative to the main body of the image processing apparatus;
    a near field communication portion arranged in the operation panel and configured to carry out near field communication with the terminal by receiving radio waves transmitted from the terminal; and
    a hardware processor configured to change a communication distance in near field communication with the terminal through the near field communication portion in accordance with a position of the operation panel.

2. The image processing apparatus according to claim 1, further comprising a pivot mechanism for pivoting the operation panel with respect to the main body of the image processing apparatus.

3. The image processing apparatus according to claim 2, wherein
    the pivot mechanism includes a horizontally extending pivot shaft.

4. The image processing apparatus according to claim 2, wherein
    the pivot mechanism includes a vertically extending pivot shaft.

5. The image processing apparatus according to claim 2, wherein
    the operation panel is configured to change a position of the near field communication portion in a direction of depth of the image processing apparatus as the operation panel pivots around the pivot mechanism, and
    the hardware processor is configured to decrease a communication distance of the near field communication portion as the near field communication portion is located on a front side of the image processing apparatus.

6. The image processing apparatus according to claim 2, wherein
the hardware processor is configured to specify an angle of pivot of the operation panel around the pivot mechanism and to change the communication distance in accordance with the specified angle.

7. The image processing apparatus according to claim 1, further comprising a plurality of members for electrically connecting the operation panel and the hardware processor to each other, wherein
the plurality of members are arranged at positions different from one another in a direction of depth of the image processing apparatus.

8. The image processing apparatus according to claim 7, wherein
the hardware processor is configured to decrease a communication distance of the near field communication portion as the operation panel is located on a front side of the image processing apparatus.

9. A method of controlling an image processing apparatus capable of near field communication with a terminal, the image processing apparatus including an operation panel attached to be variable in position relative to a main body of the image processing apparatus and a near field communication portion arranged in the operation panel and configured to carry out near field communication with the terminal by receiving radio waves transmitted from the terminal, comprising:
changing a communication distance in near field communication with the terminal through the near field communication portion in accordance with a position of the operation panel.

10. A non-transitory computer-readable storage medium storing a program executed by a computer of an image processing apparatus capable of near field communication with a terminal, the program causing the computer to perform the method according to claim 9.

* * * * *